United States Patent

[11] 3,537,476

| [72] | Inventor | Bryce B. Evans |
| | | Jackson, Michigan |
| [21] | Appl. No. | 788,982 |
| [22] | Filed | Nov. 29, 1968 |
| [45] | Patented | Nov. 3, 1970 |
| [73] | Assignee | Aeroquip Corporation |
| | | Jackson, Michigan |

[54] FLUID COUPLING CONNECTABLE UNDER HIGH PRESSURE
15 Claims, 8 Drawing Figs.

[52] U.S. Cl. ..................................... 137/614, 137/221
[51] Int. Cl. ..................................... E03b 7/09
[50] Field of Search ........................... 137/614, 614.02, 614.03, 614.04, 614.05, 221

[56] References Cited
UNITED STATES PATENTS

| 3,163,178 | 12/1964 | Stratman | 137/614 |
| 3,215,161 | 11/1965 | Goodwin et al. | 137/614.04 |
| 3,234,965 | 2/1966 | Anderson | 137/614.04 |
| 3,336,944 | 8/1967 | Anderson et al. | 137/614.04 |

*Primary Examiner*—Carlton R. Croyle
*Attorney*—Jerry K. Harness

ABSTRACT: A fluid coupling of the type having interfitting male and female bodies with radially movable detents carried by the female body and held in locking engagement with the male body by a retractable sleeve. The female body is mounted on a tractor having a fluid pump. Both bodies have fluid retaining valves held normally closed. A stem valve is slidably mounted in the female retaining valve (or in both retaining valves) and coacts with a seal carried thereby, the stem valve being spring urged toward a closed position. Insertion of the male body into the female body will first cause shifting of the stem valve or valves to permit fluid flow through an orifice (or a pressure relief valve) to a cavity formed between the body halves. When the pressures on both sides of the retaining valves are equalized, they will be opened by the stem valve spring or springs. In the embodiments having a stem valve only in the female retaining valve pressure from the female body, increased if necessary by the tractor pump will open the male retaining valve.

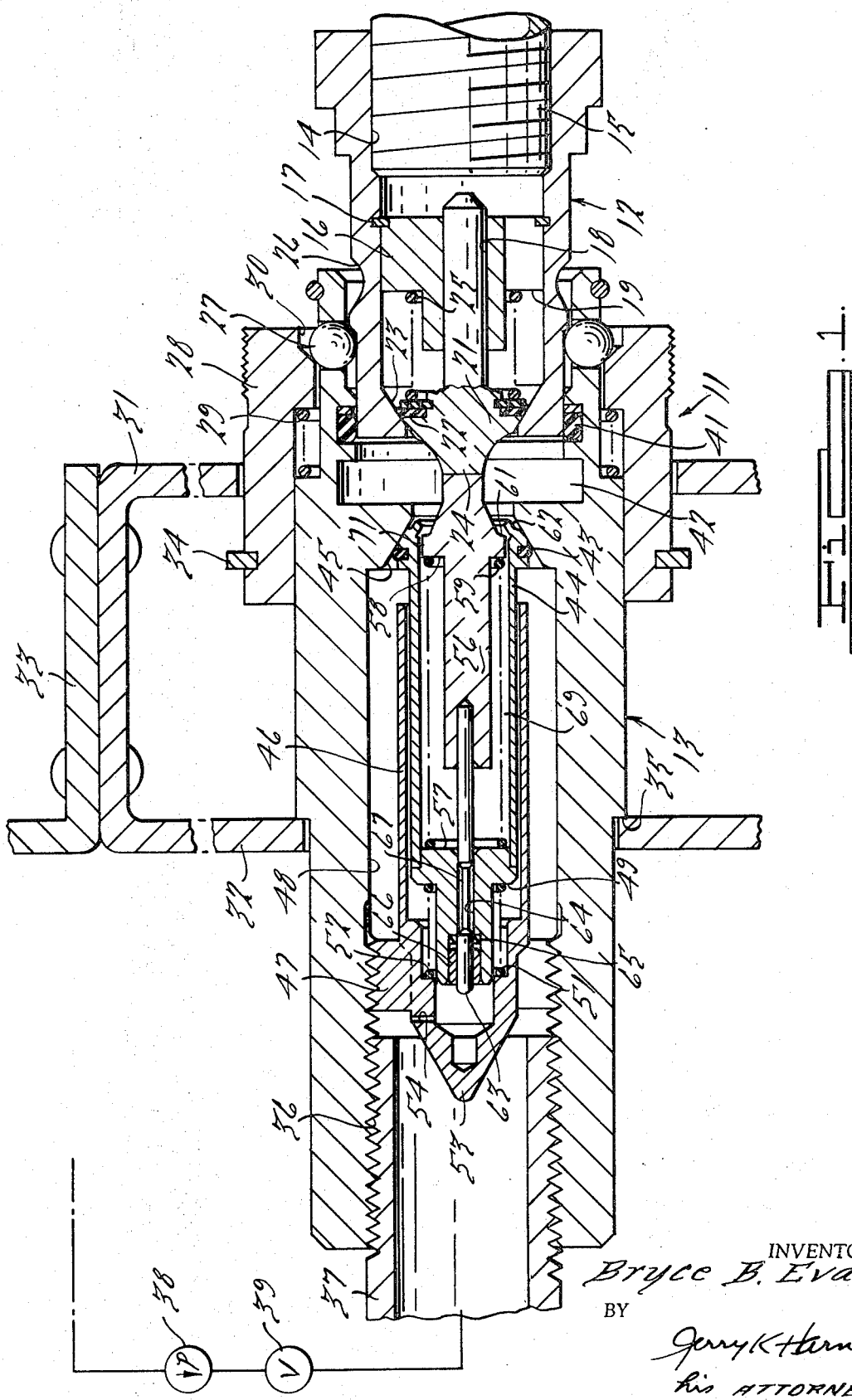

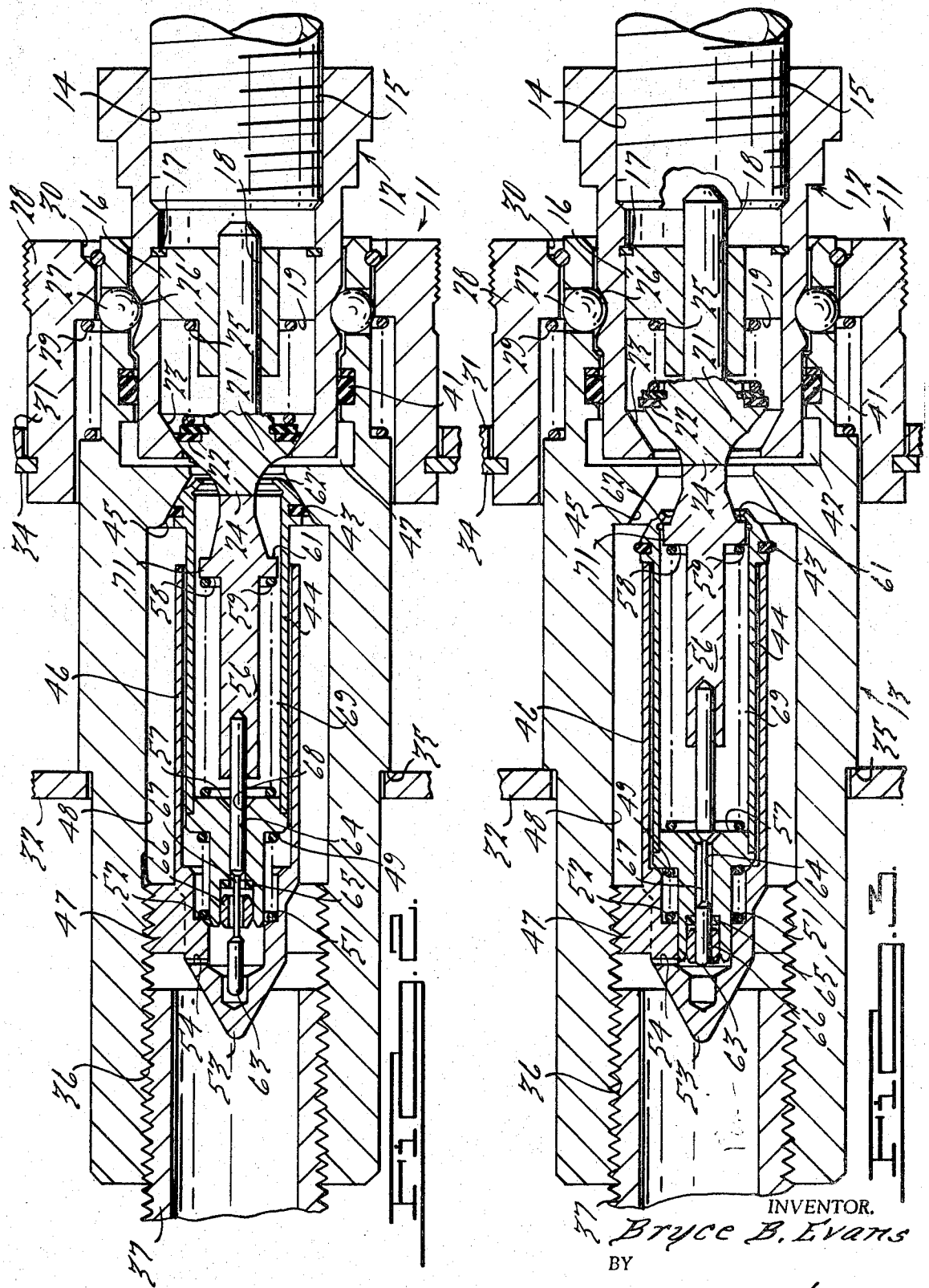

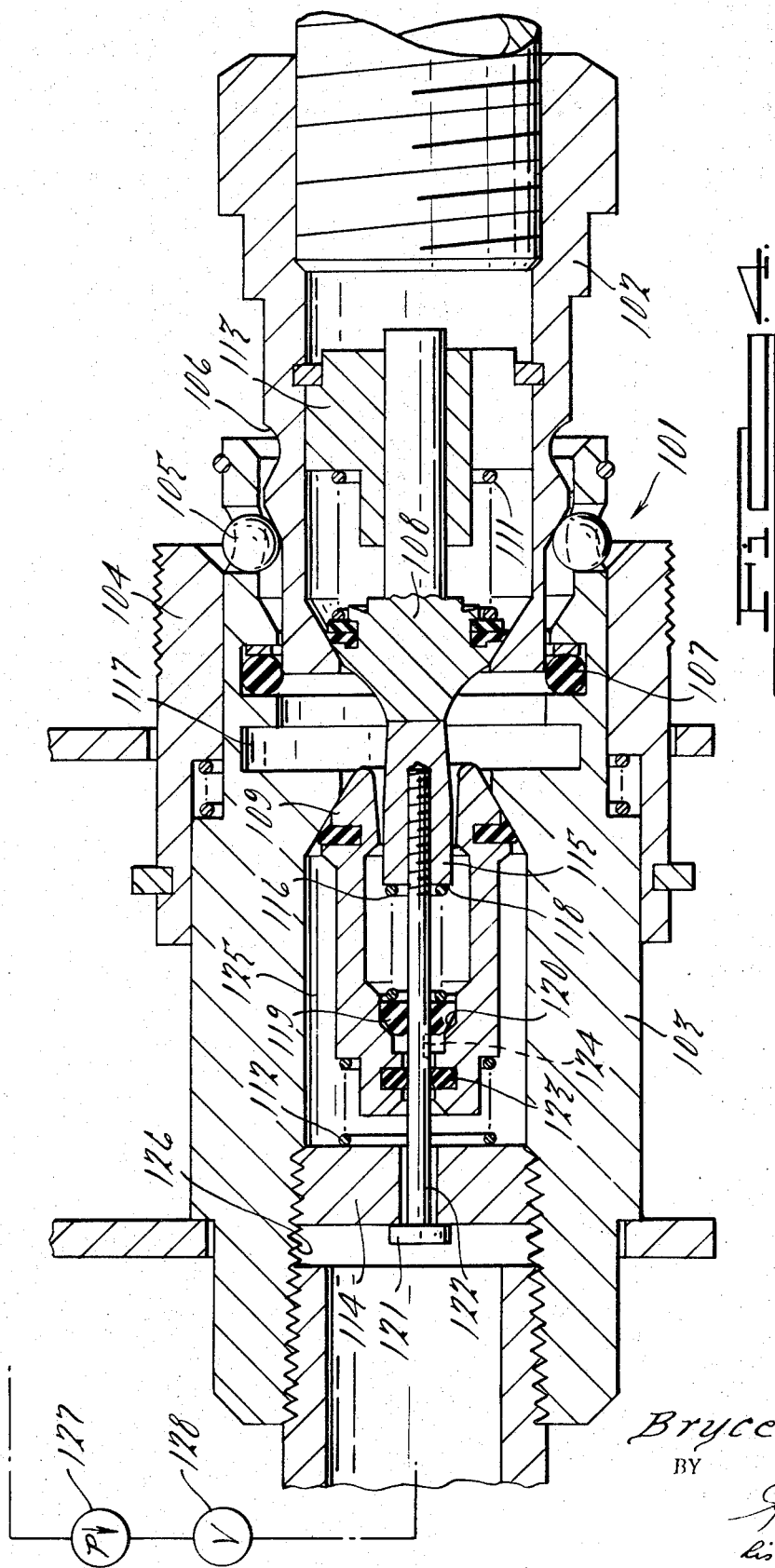

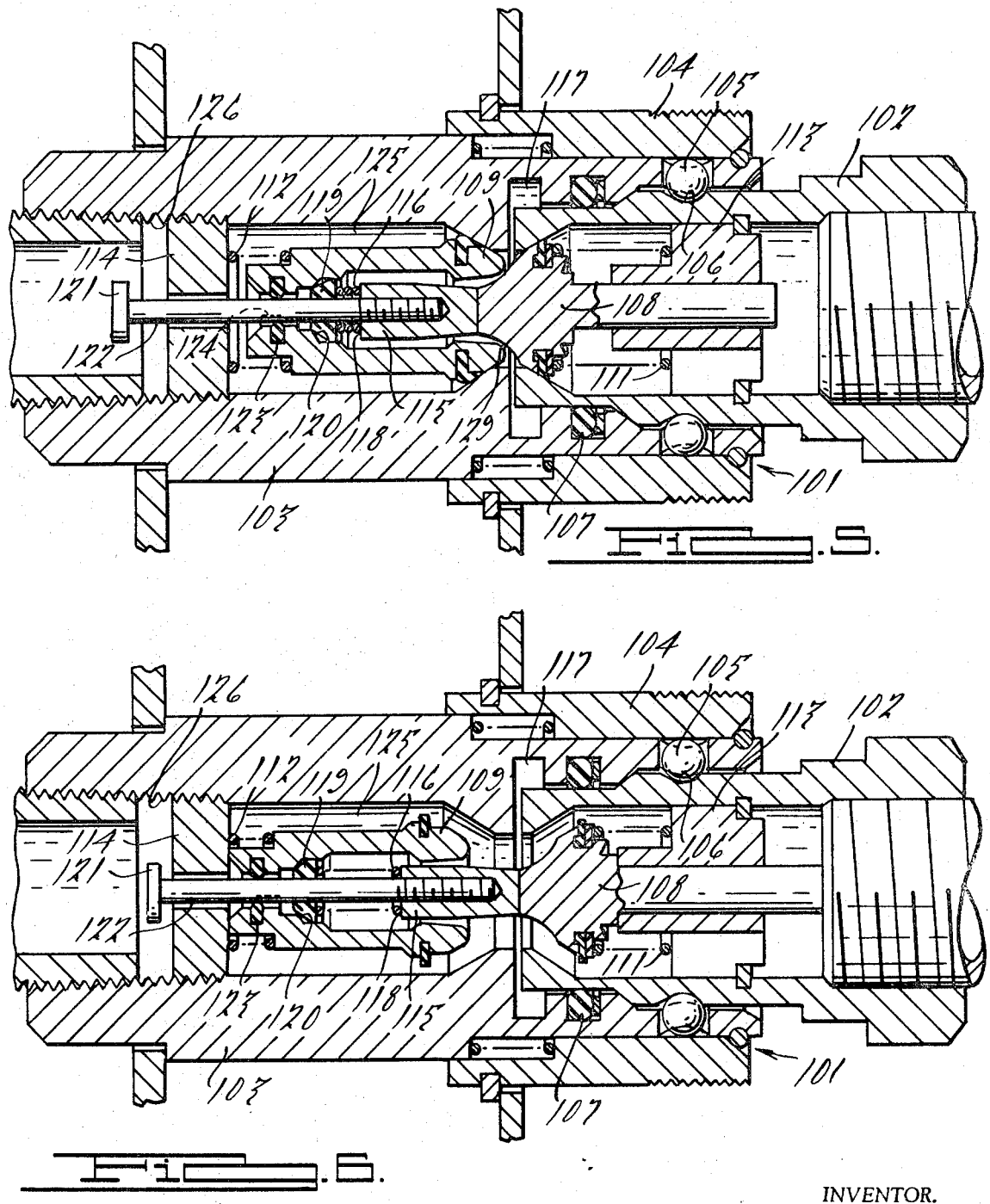

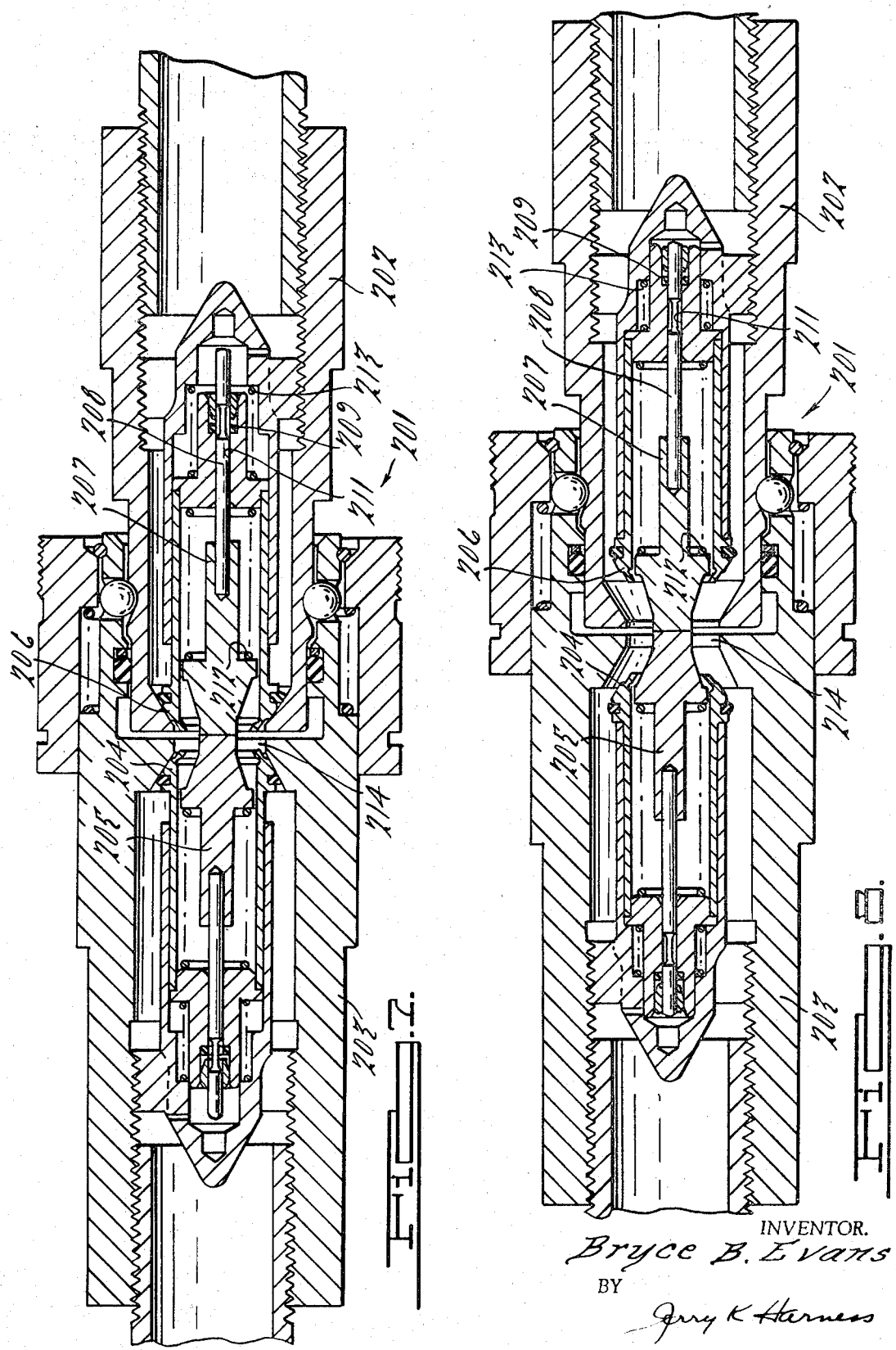

FLUID COUPLING CONNECTABLE UNDER HIGH PRESSURE

BACKGROUND OF THE INVENTION

1. Field of the Invention

The invention relates to fluid couplings of the interfitting male and female body type having normally closed fluid retaining valves. It is necessary at times to effect the coupling when the fluid in one or both bodies is highly pressurized. The fluid coupling bodies, for example, could be attached to a tractor and an implement, with one or both sides of the fluid circuit having a high pressure due to previous operation, thermal conditions or some other reason. When such pressures exist, it is often difficult to manually force open the valves to connect the coupling.

2. Description of the Prior Art

A previous construction for permitting the connection of fluid coupling halves under high pressure without undue force being required is shown in U.S. Pat. No. 3,215,161, issued Nov. 2, 1965, to Gordon W. Goodwin and Raymond E. Denney and entitled Self-Sealing Coupling. This previous construction is quite complicated however and expensive to build.

BRIEF DESCRIPTION OF THE INVENTION

In the illustrated embodiments of the invention, both the male and female bodies have spring pressed normally closed fluid retaining valves of the poppet type. In addition, a stem valve is slidably mounted in at least the female retaining valve and coacts with an annular seal carried thereby. A spring normally urges this stem valve to a closed position in which its inner portion engages the seal and its outer portion projects into the cavity which receives the male body. Insertion of the male body into the cavity will cause engagement of the male retaining valve with this stem valve, retracting it without appreciable force being required until a flat or groove on its surface permits flow past the seal and through flow control means. In the first embodiment, this means comprises an orifice formed between the stem valve and retaining valve, while in the second embodiment it comprises a pressure relief valve which opens upon the attainment of a predetermined pressure in the female body. Fluid will thus pass into the cavity between the coupled male and female bodies, resulting in equalization of pressure on both sides of the female retaining valve after coupling of the bodies has been safely completed. The spring compressed by retracting the stem valve is stronger than and counteracts the springs urging the retaining valves closed, so that approximate equalization of pressures on both sides of the female retaining valve will permit opening of this valve by the stem valve spring. When the pressure in the cavity between the coupling bodies is high enough, the male retaining valve will also open. The female body is connected to a fluid pump and manual control valve, for example on a tractor, and if the female body pressure is insufficiently high to permit the male retaining valve to be opened by the stem valve spring, the tractor pump may be used to increase the female body fluid pressure to cause the male retaining valve to open. In a third embodiment, stem valves are provided in both retaining valves, thus assuring opening of both valves when the bodies are coupled without external controls being necessary.

BRIEF DESCRIPTION OF THE DRAWINGS

FIG. 1 is a cross-sectional view in elevation of one embodiment of the invention using an orifice, the FIG. showing the male body about to be connected to the female body, and also showing in partially schematic fashion the mounting for the female body and the fluid pump and valve connected thereto;

FIG. 2 is a view similar to FIG. 1 but showing the male body fully inserted with the stem valve opened but the female retaining valve still closed;

FIG. 3 is similar to FIG. 2 but showing both the male and female retaining valves opened;

FIGS. 4, 5 and 6 are views similar to FIGS. 1, 2 and 3 respectively but showing another embodiment of the invention which incorporates a pressure relief valve to control opening of the retaining valves; and FIGS. 7 and 8 are views similar to FIGS. 2 and 3 respectively of still another embodiment of the invention which incorporates means for opening both the male and female bodies under pressure without the need for external controls.

DESCRIPTION OF THE PREFERRED EMBODIMENTS

Referring first to the embodiment of FIGS. 1 to 3, the coupling is generally indicated at 11 and comprises a male body generally indicated at 12 and a female body generally indicated at 13. The male body may be carried by a trailer or implement (not shown) and has a port 14 connectable by a fluid line 15 to a portion of a fluid system such as a cylinder (not shown). The interior of male body 12 has a valve guide 16 mounted therein, this guide having radially extending portions held in place by a ring 17, a central bore 18, and a shoulder 19 facing the outer end of the male body. A fluid retaining valve 21 is slidably mounted in bore 18 and has a sealing portion 22 engaging a frustoconical surface 23 at the outer end of the male body bore. Valve 21 has a projecting portion 24 which extends beyond the outer end of the male body when the valve is held closed by a helical coil compression spring 25 engaging shoulder 19.

The outer surface of male body 12 is provided with a groove 26 for receiving a plurality of radially movable spherical detents 27 carried by female body 11. More particularly, when the male body is inserted in the female body these detents are held in groove 26 by a sleeve 28 slidably mounted on the female body. This sleeve is urged toward its locking position by a spring 29. Retraction of sleeve 28 relative to the female body will permit detents 27 to move outwardly into an annular recess 30 at the outer end of the sleeve. Sleeve 28 is slidably carried by a member 31 and female body 13 by a member 32, these members depending from a rear frame member 33 of a tractor. Shoulders 34 and 35 on sleeve 28 and body 13 respectively limit movement of these members in opposite directions for ease in connecting and disconnecting the coupling, as described more fully in copending application Ser. No. 771,415 filed Oct. 29, 1968, now U.S. Pat. No. 3,537,478 by Bryce B. Evans et al. and entitled Quick Acting Coupling, said copending application being assigned to the assignee of the present application. It will be appreciated that other means for mounting body 13 and sleeve 28 could be utilized if desired.

The forward end of the female body has a port 36 connected by a flexible hose 37 to a portion of the fluid system, and this portion has a pump shown schematically at 38 and a manual control valve shown schematically at 39. The coupling bodies may be connected by pushing sleeve 28 forwardly with respect to body 13 until detents 27 are freed to permit insertion of the male body. Disconnection of the coupling bodies may be accomplished by pulling male body 12 rearwardly with sleeve 28 being held stationary. The breakaway feature of this construction comes into play when the tractor moves forwardly with respect to the implement, for example, when the implement is unhitched. In such case, sleeve 28 will be pulled forwardly with respect to female body 13 until detents 28 are released, permitting the female body to be pulled away from the male body.

When male body 12 is connected to female body 13, it engages an annular seal 41 carried by the female body. The two bodies form a cavity 42 on the side of seal 41 accessible to fluid pressure. The outside of seal 22 is exposed to this cavity, and so is the outside of the female body poppet seal 43. This seal is carried by female retaining valve 44, which comprises a cylindrically shaped member slidably mounted within female body 13 and carrying seal 43 at its outer end, the seal being engageable with a frustoconical surface 45 formed in female body 13 adjacent cavity 42. The means for slidably mounting valve 44 comprises a guide 46 mounted within body 13 by radially extending webs 47 threaded into port 36. Guide 46 is spaced inwardly from bore 48 of female body 13, and valve 44 is spaced slightly inwardly from guide 46. Valve 44 and guide 46 have facing shoulders 49 and 51 respectively, between which is disposed a helical coil compression spring 52. This spring urges valve 44 to its closed position. A nose-shaped portion 53 extends from webs 47 into port 36, and radial passages 54 extend through portion 53 into a chamber 55 within the nose-shaped portion.

A stem valve 56 is slidably mounted within valve 44. Facing shoulders 57 and 58 on valve 44 and valve 56 respectively support opposite ends of a helical coil compression spring 59 which urges stem valve 56 outwardly with respect to valve 44. A shoulder 61 on stem valve 56 engages a shoulder 62 at the outer end of valve 44 to limit the outward movement of the stem valve. In its outer position, valve 56 protrudes sufficiently so that the end 24 of valve 21 will engage it when the male body 12 is inserted in the female body 13, moving stem valve 56 forwardly.

Valve 56 carries a relatively narrow pin portion 63 which is slidably mounted in a bore 64 at the rearward end of valve 44. Bore 64 carries an annular seal 65 which coacts with pin 63, seal 65 being held in place by an annular member 66. When stem valve 56 is extended as shown in FIG. 1, the surface of pin 63 will engage seal 65. However, pin 63 has a flat, grooved or otherwise reduced portion 67, and when stem valve 56 is retracted to the FIG. 2 position, this reduced portion will be adjacent seal 65 so that fluid may flow past the seal. The narrow space 68 between pin 63 and valve bore 64 forms an orifice, so that fluid passing seal 65 will flow into chamber 69 in which spring 59 is disposed. Portion 71 of stem valve 56 is guided loosely by valve 44 and the fluid will flow past portion 71 and through the remainder of valve 44 into cavity 42. Of course, this fluid will flow at a rate controlled by the size of orifice 68.

In operation, assuming an initial condition in which the coupling bodies are disconnected, and some fluid pressure exists in both the male and female bodies, retaining valves 21 and 44 will be in the positions shown in FIG. 1. Moreover, stem valve 56 will be in its right-hand position engaging shoulder 62 of poppet valve 44 so that seal 65 engages pin 63. If it is desired to connect the coupling, sleeve 28 will be moved to the left, freeing detents 27 so that male body 12 may be inserted in the female body, as shown in FIG. 2. After body enters seal 41, portion 24 of valve 21 will engage stem valve 56, forcing this valve to the left. Because of its narrow diameter, pin 63 will displace only a small amount of fluid, so that there will be no appreciable pressure buildup. Sleeve 28 will be released by the operator, and when groove 26 reaches detents 27, the detents will snap into locked position, sleeve 28 sliding over the detents to hold them in this position.

The leftward movement of stem valve 56 will permit fluid under pressure to flow past seal 65, through orifice 68, and past shoulder 71 of stem 56, the fluid filling cavity 42 at a controlled rate. Any air trapped in cavity 42 will be compressed and the pressure therein will be increased. When the pressure approaches that in bore 48 of the female body, spring 59, which is stronger in its compressed condition than spring 52, will overcome spring 52 and the parts will move from their FIG. 2 to the FIG. 3 positions. This will withdraw valve seal 43 from surface 45. If the pressure in cavity 42 also approaches that in male body 12, spring 59, which is stronger than spring 25, will also cause male retaining valve 21 to open. If the pressure in cavity 42 is insufficient to cause opening of valve 21, pump 38 on the tractor may be actuated and valve 39 opened to increase the pressure in cavity 42 until the male retaining valve opens.

FIGS. 4, 5 and 6 show another embodiment of the invention which is similar to the first embodiment but in which means are provided for preventing the fluid retaining valves from opening after the the bodies have been coupled, until a predetermined relatively high pressure is developed in the female body. The purpose of this construction is to prevent a sudden increase of pressure at the connection from causing premature valve opening which could endanger the person making the connection. Such sudden pressure increase might occur through movement of the equipment or from other causes. With this embodiment, the valves will not be opened until external controls are actuated to increase the fluid pressure, thus permitting the operator to take prior safety precautions.

The coupling of this embodiment is generally indicated at 101 and comprises a male body 102 and a female body 103. The male body may be carried by an implement (not shown) and the female body by a tractor as in the previous embodiment. A sleeve 104 on the female body controls detents 105 which coact with a groove 106 on the male body to lock the bodies in connected relation. A seal 107 carried by the female body engages male body 102 when the bodies are coupled. Fluid retaining valves 108 and 109 are carried by the male and female bodies respectively, and are urged toward their closed positions by springs 111 and 112, these springs being supported by webs 113 and 114 respectively within the male and female bodies.

A stem valve 115 is slidably mounted within female retaining valve 109 and is urged by a helical coil compression spring 116 toward a position protruding into the cavity 117 which receives male body 102. Spring 116 is supported at one end by a shoulder 118 on valve 115 and at the other end by a pressure relief valve 119 of the poppet type which engages a seat 120 within valve 109. The protruding position of valve 115 is controlled by a shoulder 121 which engages web 114. A pin 122 on valve 115 passes through web 114 and also through a seal 123 carried by valve 109. In its protruding position, as seen in FIG. 4, seal 123 engages pin 122 so that fluid may not flow past this seal. However, when male body 102 is connected to the female body as seen in FIG. 5, valve 109 and pin 122 are shifted to the left, bringing a flat or groove 124 on pin 122 opposite seal 123 so that fluid may flow past this seal into a chamber 125 adjacent valve 119.

In operation of the embodiment of FIGS. 4, 5 and 6, assuming an initial condition in which the bodies are disconnected and have normal pressures therein, connection will be accomplished by retracting sleeve 104, inserting body 102 in body 103 and releasing the sleeve, as in the previous embodiment, so that the position in FIG. 5 will be reached. This will permit fluid pressure from port 126 of the female body to pass seal 123 and enter chamber 125 where it will act against valve 119. However, the strength of spring 116 may be chosen so that at normal operating pressures of port 126, valve 119 will not be lifted. Therefore, the pressure will not build up in cavity 117, and neither retaining valve 108 or 109 will be opened.

When pump 127 is operated and valve 128 opened on the tractor, the increase in pressure at port 126 and in chamber 125 will cause valve 119 to open. Fluid will flow past this valve and through the space 129 between valves 108 and 109 to cavity 117. This pressure will counteract the closing pressure on valves 108 and 109 which will then be opened by spring 116, as seen in FIG. 6. Valves 108 and 109 can also be opened by reducing the closing pressures on these valves in which case compressed spring 116 will counteract springs 111 and 112 to open the fluid retaining valves.

FIGS. 7 and 8 show a third embodiment of the invention which is similar to that of FIGS. 1 to 3 except that stem valves are mounted in both the male and female retaining valves, so that when the bodies are coupled the pressurized fluid from both sides of the line will flow at a controlled rate to the central cavity. This will cause both retaining valves to open without the necessity of external controls described with respect to FIGS. 1 to 6.

The coupling of FIGS. 7 and 8 is generally indicated at 201 and comprises a male body 202 and a female body 203. The female body has a retaining valve 204 and a stem valve 205, together with their related parts, which are constructed similarly to those of the first embodiment. Retaining valve 206 of male body 202 however also carries a stem valve 207. This valve has a pin 208 coacting with a seal 209 and an orifice 211 on retaining valve 206, these parts being constructed like their counterparts in the female body. A spring 212 is disposed between stem valve 207 and retaining valve 206 and counteracts spring 213 which normally holds retaining valve 206 closed.

In operation of the embodiments of FIGS. 7 and 8, after the bodies are coupled, the parts will assume the position of FIG. 7 in which both stem valves 205 and 207 are shifted to their open position, permitting fluid to flow through both bodies at a controlled rate to a central cavity 214 between them. When the pressure in this central cavity becomes sufficient to counteract the pressure holding either one of the retaining valves closed, that retaining valve will be opened by the urging of its stem valve spring which overcomes the retaining valve spring. Should this pressure be insufficient to open the other retaining valve, pressure will continue to build up in cavity 214 until it is sufficient to counteract the pressure holding this second retaining valve closed. The parts will then assume the position shown in FIG. 8. Thus, without the necessity of any external controls or added pressure, it is assured that upon coupling of the bodies with relatively little force, both retaining valves will open.

I claim:

1. In a fluid coupling connectable under high pressure, male and female bodies having pressurizable ports, releasable means locking these bodies in their connected position, fluid retaining valves in said bodies, springs holding said valves normally closed, a cavity formed between said bodies when connected, said retaining valves being exposed to said cavity, a stem valve slidable within one of said retaining valves, means connecting one side of said stem valve to its corresponding body port, a spring urging said stem valve toward a closed position, the stem valve in said closed position being engageable by the other retaining valve when the bodies are connected to shift the stem valve to an open position, and flow control means carried by said stem valve and its retaining valve coacting in response to shifting of the stem valve to its open position to permit fluid flow at a controlled rate from the corresponding body to said cavity whereby the buildup of fluid pressure in the cavity will counteract the fluid pressures holding said retaining valves closed, said stem valve spring counteracting said retaining valve springs, whereby said buildup of pressure will cause at least one of said retaining valves to open.

2. The combination according to claim 1, the retaining valve carrying said stem valve being tubular, said stem valve spring being a helical coil compression spring disposed between the stem and retaining valve and engaging shoulders thereon.

3. The combination according to claim 1, said stem valve having a pin and its retaining valve having a seal coacting therewith, the pin having a reduced portion disposed opposite the seal when the stem valve is open.

4. The combination according to claim 1, further provided with a tubular guide for the retaining valve which supports said stem valve, said guide being mounted in said body by radially extending webs.

5. The combination according to claim 4, said guide also having a cone-shaped portion facing the port of said body and a chamber in said cone-shaped portion within which a portion of said stem valve is disposed when the stem valve is opened, and at least one radial passage through said cone-shaped portion connecting said port with said last-mentioned chamber.

6. The combination according to claim 1, said stem valve spring being stronger than either of said retaining springs.

7. The combination according to claim 3, said control means comprising an annular orifice formed between said pin and said retaining valve for controlling the flow of fluid to said cavity.

8. The combination according to claim 1, said control means comprising an orifice formed between said stem valve and its retaining valve.

9. The combination according to claim 1, said control means comprising a pressure relief valve.

10. The combination according to claim 9, said pressure relief valve being slidably mounted on said stem valve and urged by the stem valve spring against a land formed in said retaining valve.

11. The combination according to claim 1, said stem valve being in the female retaining valve, and means connected to said female body for increasing the pressure therein.

12. The combination according to claim 11, said last-mentioned means comprising a pump, and a control valve between said pump and said female body.

13. The combination according to claim 1, further provided with a second stem valve slidable within the other retaining valve, means connecting one side of said second stem valve to its corresponding body port, a spring urging said second stem valve toward a closed position, the stem valve in said closed position being engageable by the first-mentioned retaining valve when the bodies are connected to shift the second stem valve to an open position, and flow control means carried by said second stem valve and its retaining valve coacting in response to shifting of the second stem valve to its open position to permit fluid flow at a controlled rate from the corresponding body to said cavity whereby the buildup of fluid pressure in the cavity will counteract the fluid pressures holding said retaining valves closed, said second stem valve spring counteracting said retaining valve springs.

14. The combination according to claim 2, said stem valve having a pin and its retaining valve having a seal coacting therewith, the pin having a reduced portion disposed opposite the seal when the stem valve is open.

15. The combination according to claim 2, further provided with a tubular guide for the retaining valve which supports said stem valve, said guide being mounted in said body by radially extending webs.